US009534890B2

(12) United States Patent
Raiteri

(10) Patent No.: US 9,534,890 B2
(45) Date of Patent: Jan. 3, 2017

(54) MEASURING MACHINE PROVIDED WITH AN IMPROVED TRANSMISSION SYSTEM

(71) Applicant: HEXAGON METROLOGY S.p.A., Moncalieri (IT)

(72) Inventor: Andrea Raiteri, Pino Torinese (IT)

(73) Assignee: HEXAGON METROLOGY S.P.A., Moncalieri (IT)

( * ) Notice: Subject to any disclaimer, the term of this patent is extended or adjusted under 35 U.S.C. 154(b) by 381 days.

(21) Appl. No.: 14/205,165

(22) Filed: Mar. 11, 2014

(65) Prior Publication Data
US 2015/0260499 A1   Sep. 17, 2015

(51) Int. Cl.
G01B 21/04   (2006.01)
G01B 5/008   (2006.01)
G01B 3/00   (2006.01)

(52) U.S. Cl.
CPC ............ G01B 21/047 (2013.01); G01B 3/008 (2013.01); G01B 5/008 (2013.01)

(58) Field of Classification Search
CPC ....... G01B 21/047; G01B 21/04; G01B 7/008; G01B 5/008
USPC .......................................................... 33/503
See application file for complete search history.

(56) References Cited

U.S. PATENT DOCUMENTS

| 3,483,626 A | 12/1969 | Huttel | |
| 3,744,902 A * | 7/1973 | Henker | G03F 7/70716 269/58 |
| 3,785,743 A * | 1/1974 | Sartorio | B23Q 1/015 100/214 |
| 4,924,598 A | 5/1990 | Siegfried | |
| 5,042,162 A * | 8/1991 | Helms | F16F 7/1005 248/559 |
| 5,291,662 A * | 3/1994 | Matsumiya | B23Q 1/012 33/1 M |
| 6,176,018 B1 * | 1/2001 | Wiklund | G01B 5/0002 33/1 M |
| 6,690,133 B2 * | 2/2004 | Knorr | B23Q 11/0039 318/280 |
| 7,207,120 B2 * | 4/2007 | Muller | G01B 7/012 33/503 |
| 9,086,262 B2 * | 7/2015 | Pettersson | G01B 21/045 |
| 9,227,286 B2 * | 1/2016 | Sakai | B23Q 17/2495 |

FOREIGN PATENT DOCUMENTS

DE  3719509 A  12/1988
IT  EP 2623923 A1 *  8/2013 ............. G01B 3/008

OTHER PUBLICATIONS

European Search Report dated May 29, 2012 in application No. 12 42 5022.

* cited by examiner

Primary Examiner — Christopher Fulton
(74) Attorney, Agent, or Firm — Maschoff Brennan

(57) ABSTRACT

A measuring machine comprising at least one member mobile along an axis, a motor, a transmission system driven by the motor for displacing the mobile member along the axis, and a control system for controlling the motor, wherein a flexible coupling is set between said transmission system, and the mobile member is configured so as to filter the vibrations transmitted by the transmission system to the mobile member in the direction of the axis and to decouple the mobile member from the transmission system in a direction transverse to the axis.

13 Claims, 5 Drawing Sheets

MEASURING MACHINE PROVIDED WITH AN IMPROVED TRANSMISSION SYSTEM

TECHNICAL FIELD

The present invention relates to a measuring machine provided with an improved transmission system.

BACKGROUND OF THE INVENTION

Various types of co-ordinate measuring machines are known: bridge measuring machines, horizontal-arm measuring machines, pillar measuring machines, etc. Each of these machines typically comprises a reference surface, a first carriage mobile with respect to the reference surface along a first axis, a second carriage carried by the first carriage and mobile with respect thereto along a second axis perpendicular to the first axis, and a measuring spindle carried by the second carriage and mobile with respect thereto along a third axis perpendicular to the first and second axes. The spindle is designed to carry a measuring tool, which is displaced in the measuring volume as a result of the combination of the motions along the three axes.

For example, in portal measuring machines the first carriage is mobile along a horizontal axis and comprises two uprights and a horizontal cross member that defines the second axis, which is also horizontal, on which the second carriage is mobile. The spindle is constituted by a column with vertical axis, mobile with respect to the second carriage along its own axis.

The mobile members of a measuring machine are generally driven by respective electric motors via respective transmission systems.

A transmission system for a mobile member of a measuring machine must be designed so as to prevent as much as possible transmission of vibrations to the mobile member. In addition, there must be prevented transmission of forces in a direction orthogonal to the axis of motion. Generally, this is obtained thanks to the good quality of the components (motor, pinions, pulleys, belts, etc.) and by means of a very precise alignment of the transmission system with respect to the direction of motion. The connection between the motor and the mobile member, in the direction of motion, is generally made in the most rigid way possible.

SUMMARY OF THE INVENTION

The aim of the present invention is to provide a measuring machine equipped with a transmission system of an improved type that will enable reduction of vibrations and forces orthogonal to the motion, and consequently will enable a greater measuring accuracy to be obtained or, given the same measuring accuracy, higher measuring speeds or a reduction of the costs with the use of lighter structural elements.

The aforesaid aim is achieved by a measuring machine according to at least one embodiment described herein.

BRIEF DESCRIPTION OF THE DRAWINGS

For a better understanding of the present invention a preferred embodiment is described in what follows, by way of non-limiting example and with reference to the attached drawings, wherein.

DETAILED DESCRIPTION OF THE INVENTION

Figure 1:
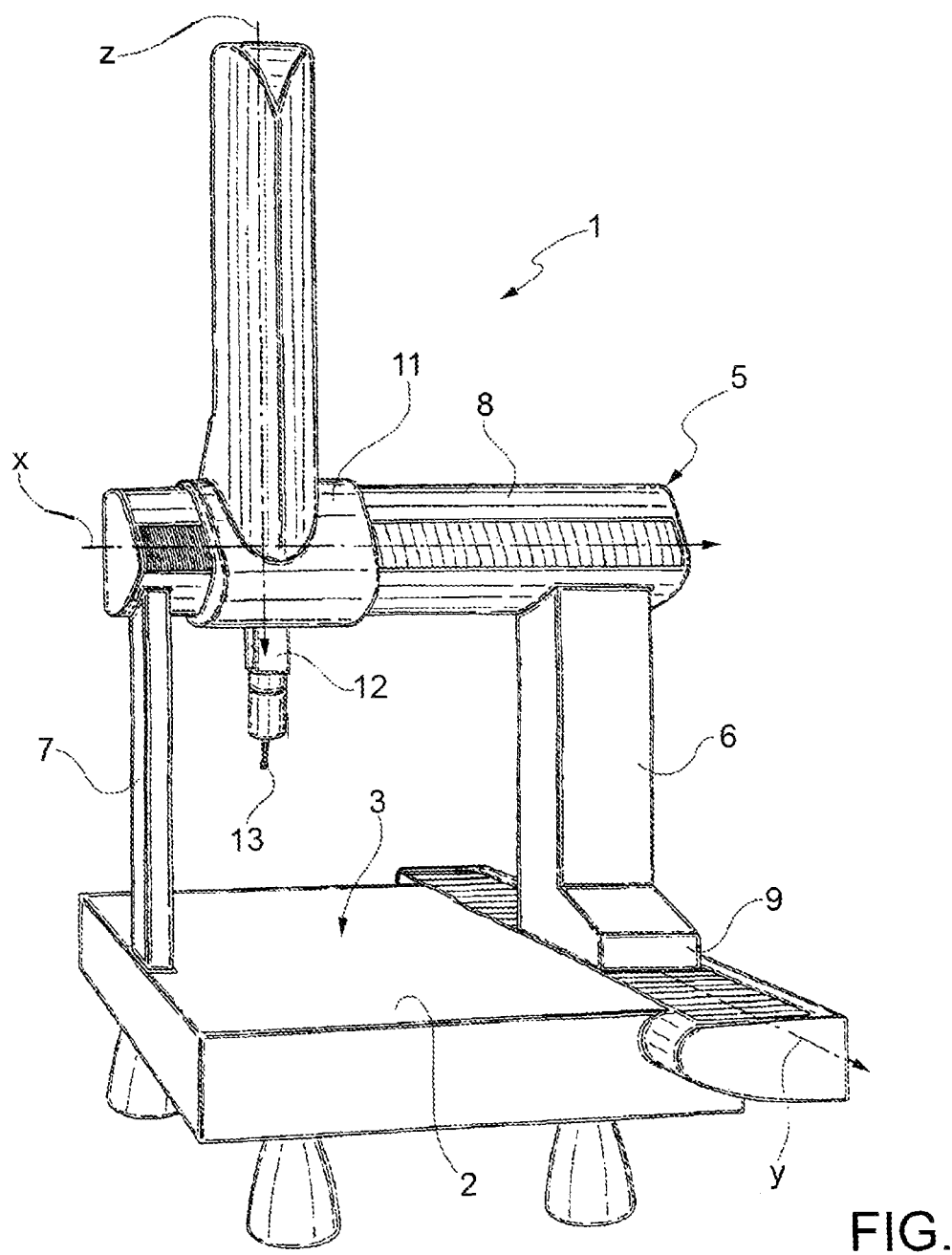
FIG. 1 is a perspective view of a portal measuring machine made according to the invention.

With reference to FIG. 1, designated by 1 is a portal measuring machine.

The machine 1 comprises a bench 2 provided with a horizontal plane top surface 3 or reference surface. The machine 1 further comprises a first motor-driven carriage 5 that slides on the bench 2 along a first horizontal axis (axis Y) of a cartesian reference system X, Y, Z of the measuring volume.

The first carriage 5 has a bridge structure and comprises two vertical uprights 6, 7 and a top horizontal cross member 8 that extends between the top ends of the uprights 6, 7.

The upright 6 comprises at the bottom a slide 9 sliding on guides (not illustrated) parallel to the axis Y and made, in a known way, in the proximity of a longitudinal edge of the bench 2.

The cross member 8 carries a second carriage 11 designed to slide thereon along guides (not illustrated) in a direction parallel to a second axis (axis X) of the reference system.

The second carriage 11 carries a spindle 12 with vertical axis, mobile along its own axis parallel to a third axis (axis Z) of the reference system. The spindle 12 is designed to carry at the bottom a measuring sensor 13 (of a known type).

Figure 2:
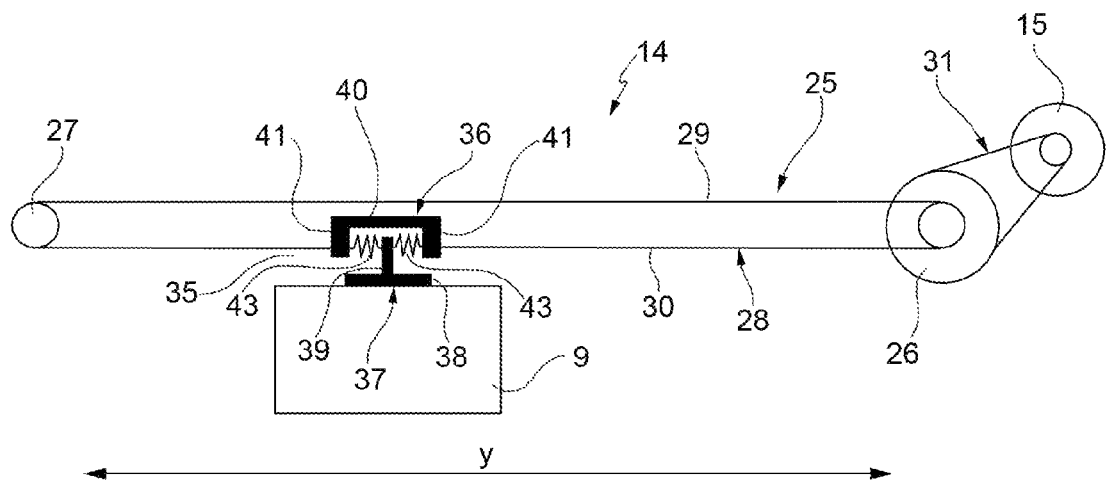
FIG. 2 is a schematic side view of a first transmission system of the machine of FIG. 1.

With reference to FIG. 2, designated as a whole by 14 is a transmission system for moving the first carriage 5 of the machine 1, of which illustrated in a purely schematic way in FIG. 2 is the slide 9.

It is at once pointed out that the slide 9 constitutes only a non-limiting example of mobile member; the transmission system of the invention can be used for driving different mobile members, for example, for driving a carriage of a horizontal-arm machine.

The slide 9 is mobile in a direction parallel to the axis Y and is governed by an electric motor 15 via a belt transmission 25 comprising a drive pulley 26, a driven pulley 27, and a belt 28 run over the pulleys 26, 27 and having its own branches 29, 30 parallel to the axis Y. The drive pulley 26 is driven by the electric motor 15 via a second belt transmission 31.

The slide 9 is connected to one of the branches (30) of the belt 28. According to the present invention, said connection is made by means of a flexible coupling 35.

The flexible coupling 35 conveniently comprises a U-shaped element 36 fixed to the branch 30 of the belt 8, and an element 37 shaped like a T set upside down fixed to the slide 9 (or vice versa).

More precisely, the element 37 comprises a base plate 38 rigidly fixed to the slide 9 and a median leg 39 extending from the plate 38 orthogonal to the latter and to the axis Y in the direction of the element 36; the element 36 comprises a plate 40 fixed to the branch 30 of the belt 28 and a pair of shoulders 41 extending from the plate 40 in the direction of the element 37 and arranged on the opposite sides (along the axis X) of the leg 39.

Set between the leg 39 and each of the shoulders 42 are elastic elements 43, for example helical springs, which are arranged with their axis parallel to the axis Y and have the purpose of filtering the vibrations of the belt 28 preventing transmission thereof to the slide 9.

The stiffness of the elastic elements 43 is calculated, according to the total weight of the carriage 5, so as to determine a natural frequency lower than the lowest structural frequency associated to the axis, for example of approximately 4-5 Hz.

The flexible coupling 35 behaves substantially like a mechanical low-pass filter: below the natural frequency, the flexible coupling 35 behaves like a rigid coupling enabling transmission of the driving forces from the belt 28 to the carriage 5; above said frequency, the flexible coupling 35 filters the vibrations preventing them from being transmitted to the carriage 5.

The vibrations are inevitably generated on the belt 28 on account both of the irregularities of the motion induced by the motor (by friction, "cogging", and tachometric undulation) and of the non-linearities of the transmission (eccentricity of the pinions and of the pulleys, irregularities caused by the toothing of the belt).

The result of the use of a flexible coupling 35 is an improvement of the metrological performance as compared to the use of a conventional rigid coupling. A further advantage of the use of the flexible coupling 35 is the decoupling between the carriage 5 and the belt 28 in a direction orthogonal to the direction of motion.

The use of a flexible coupling on the other hand introduces two problems:
1) the springs 43 have a zero or very low damping effect; consequently, they tend to oscillate without control at their natural frequency;
2) the springs 43 introduce a delay in following of the carriage 5 as compared to the belt 28 during the ramps of acceleration and deceleration.

The flexible coupling 35 must hence be used in combination with a control of the motor such as to overcome the aforesaid problems.

Figure 3:
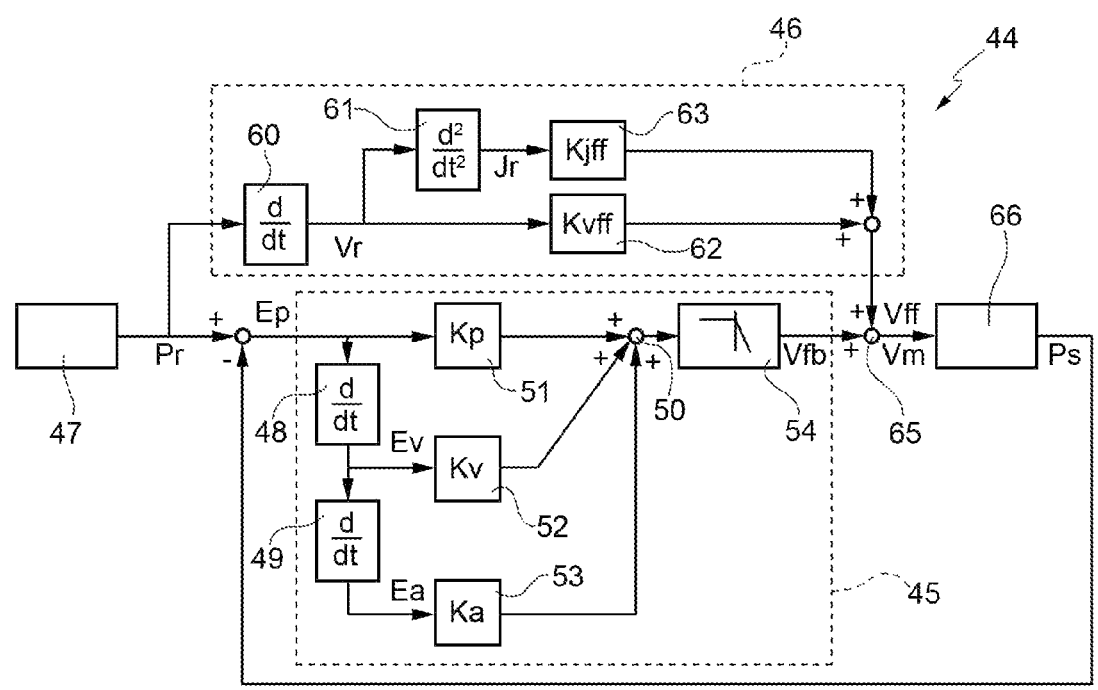
FIG. 3 is a block diagram of a control of the transmission system of FIG. 3.

According to a preferred embodiment of the invention, said control is provided by the control system 44 illustrated in the block diagram of FIG. 3.

The system 44 comprises a feedback-control component, represented by the bottom dashed block 45 and has the main purpose of damping the oscillations of the springs, as well as that of containing the path errors, and an open-loop component represented by the top dashed block 46 and designed to provide an important contribution to the path control.

The feedback control receives at input a position-error signal Ep obtained by subtracting the position signal Ps detected by the transducer associated to the axis Y from a position-reference signal Pr generated by a path generator 47.

The position-error signal Ep is differentiated a first time in a first derivative block 48 to determine a speed error Ev and a second time in a second derivative block 49 to determine an acceleration error Ea. The three error components Ep, Ev, Ea are sent to an adder block 50 through respective multiplier blocks 51, 52, 53 having respective gains Kp, Kv and Ka. At output from the adder block, a low-pass filter 54 eliminated the high-frequency components, thus obtaining at output a feedback component Vfb of the command signal. The low-pass filter 54 has the dual function of reducing the effect of the high-frequency noise that is generated by the axis-position transducer and of eliminating any undesirable interaction between the action of control and the structural natural frequencies of the machine.

The peculiarity of the feedback control described is constituted by the component proportional to the acceleration error, which is absent in classic PID controls commonly used. This component is mainly responsible for damping the oscillations of the springs 43, as may be verified rigorously with classic control theory. Intuitively, this may be understood by observing that the force F exchanged between the carriage 5 and the springs 43 is proportional both to the acceleration Ac of the carriage 5 (F=M·Ac, where M is the mass of the carriage 2) and to the deformation $\Delta x$ of the springs 43 (F=K·$\Delta x$, where K is the total stiffness of the springs 43), and hence, at least at a constant reference speed, a control based upon the acceleration error is equivalent, for practical purposes, to a control on the deformation $\Delta x$ of the springs.

The open-loop control 46 receives at input the position-reference signal Pr from the path generator 27. Said signal is differentiated once in a first derivative block 60 to obtain a signal representing a nominal speed of the carriage 2. A second derivative block 61 calculates the second derivative of the signal Vr to obtain a signal Jr (jerk).

It may be noted that the reference signals Vr, Jr, instead of via numerical derivatives as set forth above by way of example, can be generated in any other way aimed at minimizing the numerical errors and optimizing the code. The same may be said for the other quantities contained in the block diagrams.

The signals Vr and Jr are sent, through respective multiplier blocks 62, 63 having respective gains KVff and Kjff, to an adder block 44, from which there is obtained at output an open-circuit component Vff of the command signal.

The two components Vfb and Vff are added in an adder block 65 to obtain a command signal Vm for the motor for driving the carriage 5 (represented by a single block 66 together with the corresponding servo-amplifier and the mechanics).

The speed component of the open-loop control contributes substantially to containing the path errors Ep at constant speed.

The jerk component of the open-loop control contributes to reducing the path error Ep in the steps in which the acceleration varies, i.e., at the start and at the end of the acceleration or deceleration ramps. For the predictive jerk control to be effective, it is necessary to know precisely the total stiffness K of the springs 43, and a "smooth" path generator 47 is necessary, i.e., one capable of limiting the jerk to prevent any undesirable shock. The jerk control enables containment of the path error originated by the springs in the presence of considerable accelerations (for example, 1 m/s$^2$ or more).

Figure 4:
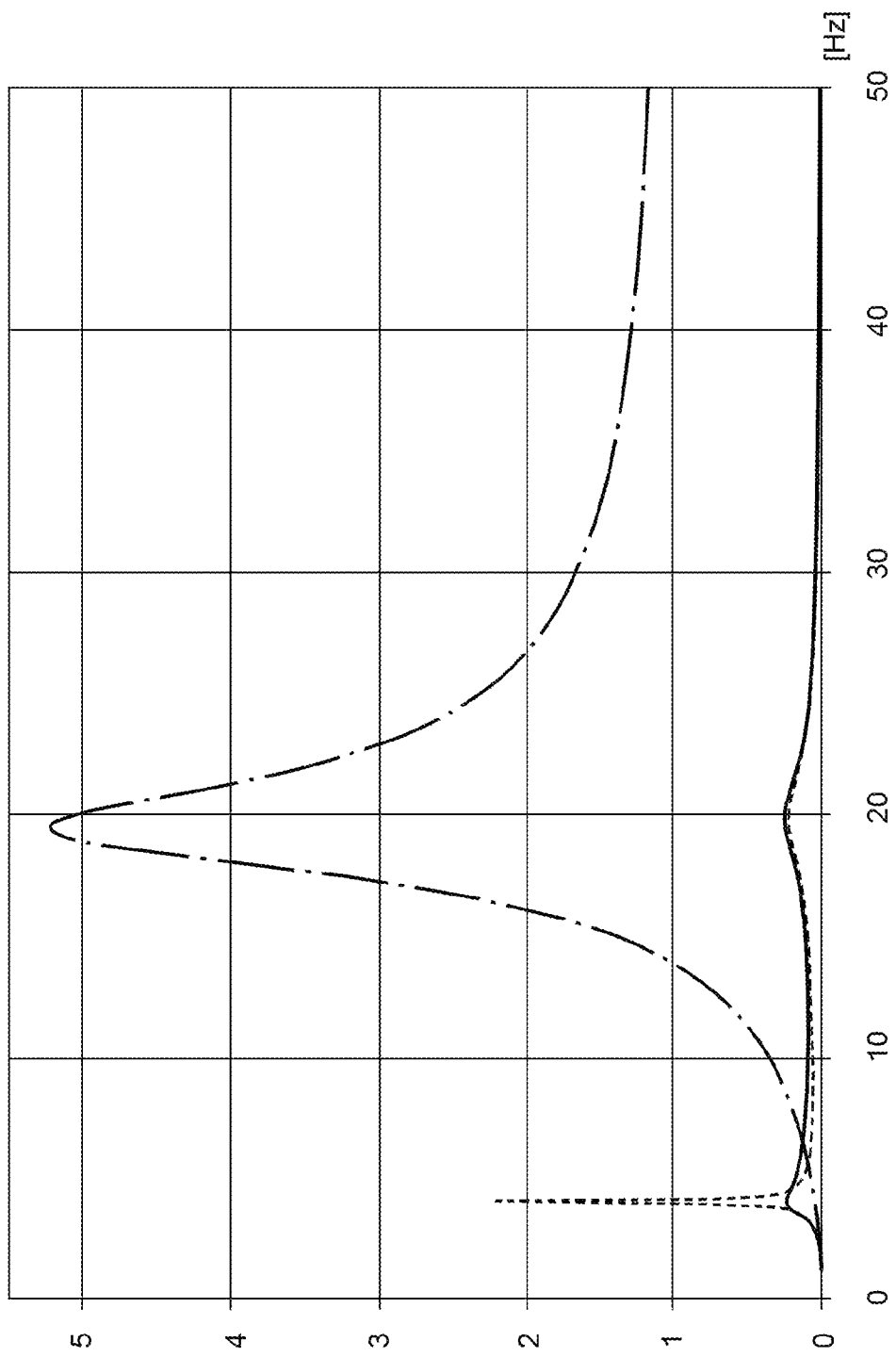
FIG. 4 is a comparative graph that illustrates the differences of frequency response between a conventional transmission system, the system of the invention without control of position, and the system of the invention with a control according to a preferred embodiment of the invention.

In order to illustrate better the effects of the flexible coupling 35 and of the control of position of the carriage 5, the graph of FIG. 4 represents the dynamic behaviour of the control as the frequency of a forcing in three different conditions varies:
  with a rigid coupling and without control of position (dashed-and-dotted curve), with a flexible coupling but without control of position (dashed curve), and with a flexible coupling and control of position (solid curve).

The abscissae represent the frequency, the ordinates the gain; consequently, to values lower than 1 there corresponds an attenuation and to values greater than 1 there corresponds an amplification of the vibrations transmitted from the belt 28 to the carriage 5.

As may be readily noted (dashed-and-dotted curve), in the absence of flexible coupling and of control of position, the carriage 5 has a peak around 20 Hz, with a gain of more than 5. This means that a vibration of 1 µm of amplitude of the belt at that frequency results in a vibration of more than 5 µm in amplitude of the carriage. The portion of curve above the peak frequency has a gain tending asymptotically to 1.

Introducing the flexible coupling (dashed curve), the peak at 20 Hz disappears but one appears at a lower frequency, for example around 4 Hz. Outside the peak, the entire curve denotes a dynamic behaviour of attenuation of the vibrations.

The combined use of the flexible coupling 35 and of the control of position (solid curve) enables maintenance of the globally attenuating behaviour of the previous curve, but also elimination of the peak at low frequency, thus obtaining a stable system with a low sensitivity to the vibrations of the belt at any frequency.

For the control described to produce optimal results, it is necessary for the forces of disturbance on the mobile member to be negligible. This normally occurs in portal machines, where the guide system is based upon pneumostatic runners, which have a very low friction.

Figure 5:
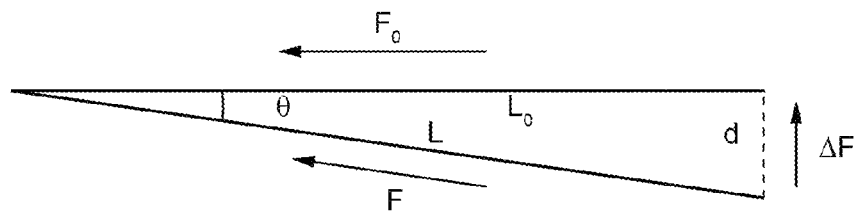
FIG. 5 is a diagram illustrating the forces transmitted by a spring of a flexible coupling of the transmission system of FIG. 2.

In the embodiment of FIG. 2, using two tension springs 43, any possible slight misalignment of the belt 28 with respect to the guide of the slide 9 produces a slight rotation of the springs 43 with respect to the axis Y (angle θ). This situation is exemplified in the diagram of FIG. 5, where just the left-hand spring 43 is considered.

If K is the stiffness of the spring, the tension of the spring when aligned in a horizontal direction is $$F_0 = K \cdot (L_0 - L_r), \quad (1)$$

where $L_r$ is the length of the spring at rest and $L_0$ the length of the spring in conditions where it is mounted in the coupling. If the spring goes out of line, its length L increases, and also the force F increases proportionally. In particular, there appears an orthogonal component given by $$\Delta F = K \cdot (L_0/\cos \theta - L_r) \cdot \sin \theta \approx F_0 \cdot d/L_0 \quad (2)$$

where the last term is a first-order approximation, and d is the linear misalignment.

In the case where the springs 43 were compression springs, an expression similar to Eq. (2) would be obtained, with the opposite sign.

Consequently, given a certain misalignment d, the orthogonal force can be reduced either by increasing $L_0$ (but this would increase the overall dimensions of the coupling and hence the useful travel) or by reducing $F_0$ (which, however, cannot be less than the force required for displacing the mobile member, otherwise the preloading of the spring would completely vanish in the transients).

Figure 6:
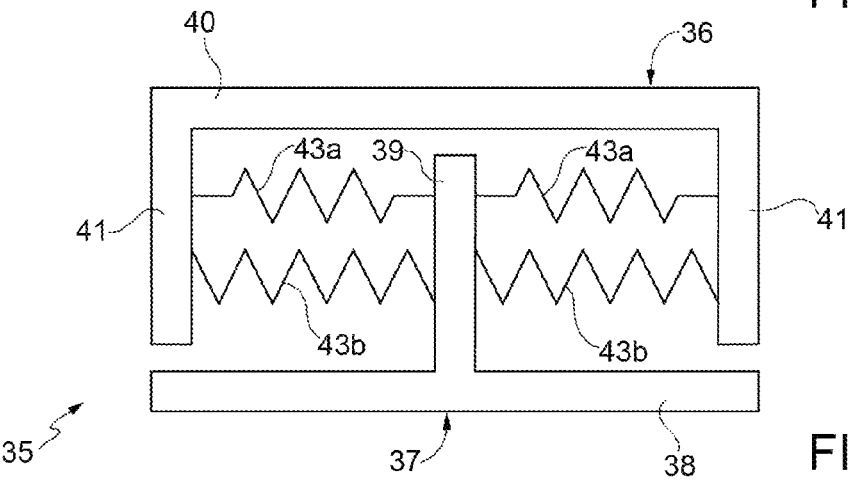
FIGS. 6, 7, and 8 are variant embodiments of a flexible coupling of the transmission system of FIG. 2.
Figure 7:
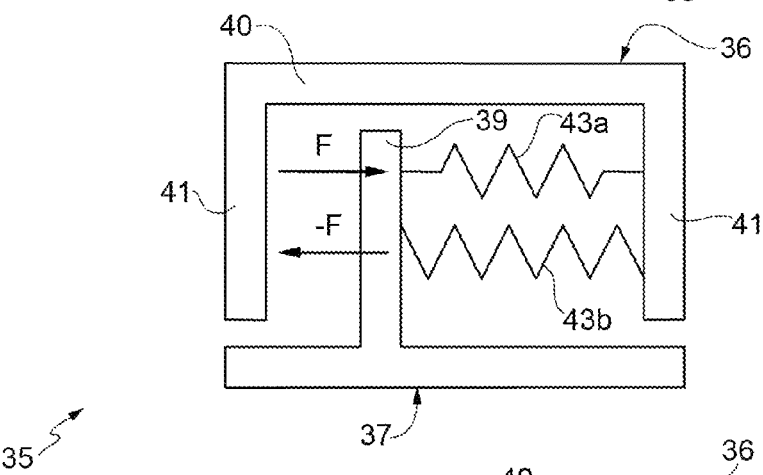
Figure 8:
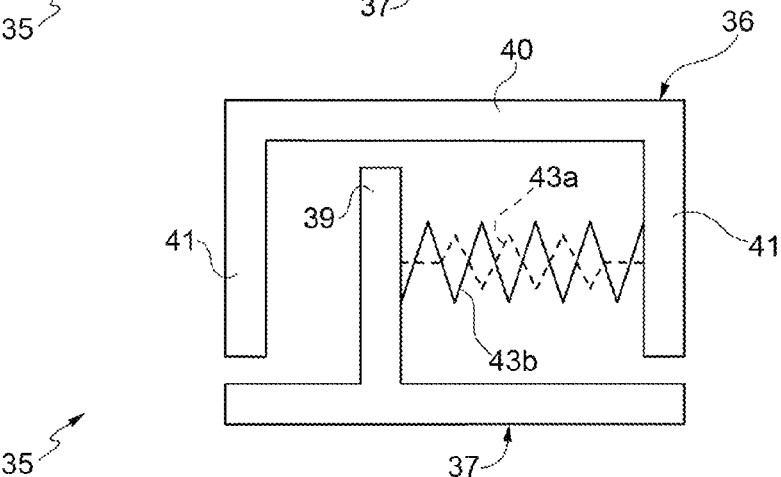

In order to solve this problem, FIGS. 6, 7, and 8 illustrate variants of the flexible coupling 35 using one or more pairs of springs 43a, 43b in parallel with respect to one another, of which one works in tension and the other in compression. In this way, the orthogonal components that are generated on account of any possible misalignment are equal and opposite to one another, and hence, at least in theory and in the range of a first-order approximation, their resultant is zero.

In FIG. 6 two pairs of springs 43a, 43b are used, each pair instead of a spring 43 of the example of FIG. 2. In the example of FIG. 7, just one pair of springs 43a, 43b is used on just one side of the coupling 35, thus enabling reduction of the overall dimensions thereof.

The embodiment illustrated in FIG. 8 is similar to that of FIG. 6, but the two springs 43a, 43b are coaxial to one another and mounted inside one another. In this way, also the low torque that is generated as a result of the different points of application of the forces of the springs 43a, 43b in the solutions of FIGS. 6 and 7 is eliminated.

Figure 9:
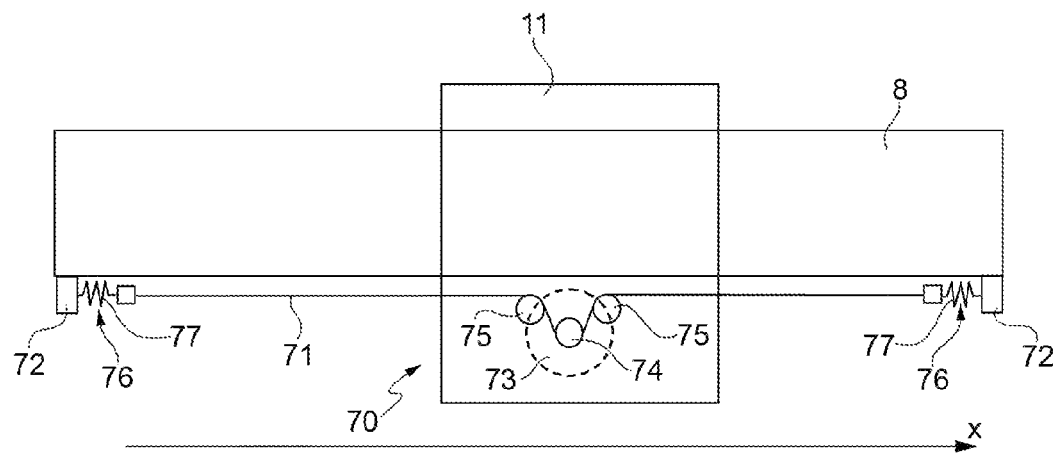
FIG. 9 is a schematic top plan view of a second transmission system of the machine of FIG. 1.
Figure 10:
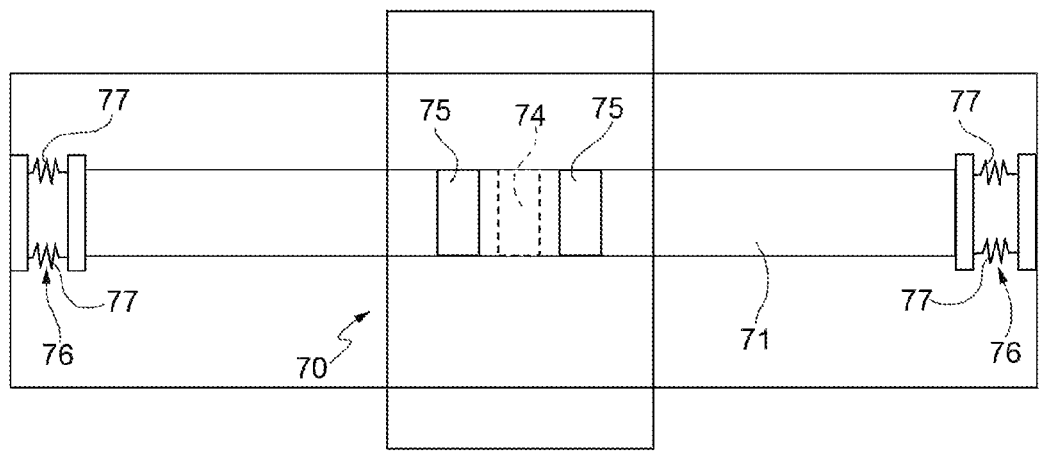
FIG. 10 is a schematic view in elevation of a second transmission system of the machine of FIG. 1.

FIGS. 9 and 10 are schematic illustrations of a transmission system 70 for moving the carriage 11 along the cross member 8 of the machine 1.

In this case, the transmission system 70 comprises a fixed toothed belt 71, extending in a vertical plane parallel to the axis X and constrained to end supports 72 fixed with respect to the cross member 8. An electric motor 73 sets in motion, through a reducer (not illustrated), a toothed pinion 74 meshing with the belt 71. For this purpose, two idle pulleys 75, arranged at the sides of the pinion 72, form with this a loop of the belt 71 that is run over the pinion 74 with the correct winding angle.

According to the present invention, the ends of the belt 71 are constrained to the respective supports 72 via flexible couplings 76.

As is more clearly visible in FIG. 10, each of the two flexible couplings 76 comprises a pair of helical springs 77 having axes parallel to one another and to the axis X, and set on top of one another so as to keep the belt 51 aligned in a vertical plane.

The control of the electric motor 73 is obtained in a way similar to what is described for the motor 66. Any possible vibrations produced by the motor 66 or by the reducer (not illustrated) are transmitted to the belt 51. If the belt were rigidly constrained at its own ends, as in conventional fixed-belt transmissions, the belt would not be able to vibrate and consequently the vibrations would be transmitted to the carriage 11. According to this embodiment of the invention, instead, the belt is free to vibrate longitudinally, and consequently the vibrations are filtered in a way similar to what has been described with reference to the carriage 5.

From the foregoing description, it is evident how the present invention enables reduction of the vibrations in the direction of motion and of the forces orthogonal to the motion, and consequently enables a higher measuring accuracy to be obtained or, given the same measuring accuracy, higher measuring speeds or a reduction of the costs with the use of lighter structural elements.

Moreover, thanks to the present invention, the specifications regarding the quality of the components of the transmission system and regarding the precision with which the transmission system itself must be aligned become less stringent, with a further potential reduction in costs.

Finally, it is clear that modifications and variations may be made to the machine 1 described herein, without thereby departing from the sphere of protection defined by the claims.

In particular, the machine can be of any type, for example, of the horizontal-arm or pillar type, instead of being of the portal type. The transmission system can be provided for any mobile member of the machine, for example a horizontal arm, a cross member, or a vertical spindle. The motor for driving the mobile member can be of any type, for example a linear motor, and the transmission can be of a type different from a belt, for example, an external screw/internal screw transmission.

The invention claimed is:

1. A measuring machine comprising:
    at least one member mobile along an axis;
    a motor;
    a transmission system co-operating with the motor for displacing the mobile member along said axis; and
    a control system for controlling said motor,
    wherein said transmission system comprises at least one flexible coupling configured so as to filter the vibrations generated by at least one of said motor and transmission system and transmitted to the mobile member in the direction of said axis and to minimize the forces acting on said mobile member in a direction transverse to said axis,
    the at least one flexible coupling comprising at least one resilient member deformable in a direction parallel to said axis, and
    said control system configured so as to control the position of said mobile member to minimize the position errors of the mobile member along said axis resulting from the deformations of said at least one resilient member.

2. The measuring machine according to claim 1, wherein said control system comprises a feedback control and an open-loop control.

3. The machine according to claim 2, wherein the feedback control comprises a control component in response to an acceleration error.

4. The machine according to claim 3, wherein the feedback control comprises a control component in response to a speed error.

5. The machine according to claim 2, wherein the feedback control comprises a control component in response to a position error.

6. The machine according to claim 1, wherein said at least one resilient member comprises at least one helical spring having its axis parallel to said axis.

7. The machine according to claim 6, wherein said motor is fixed and the transmission system comprises a mobile belt driven at least indirectly by said motor and an output member fixed to said mobile belt; said at least one resilient member being set between the output member and the mobile member.

8. The machine according to claim 7, wherein one between the output member and the driven member has a first portion set between respective second portions of the other between the output member and the driven member in the direction of said axis, said elastic means comprising at least two springs set between the first portion and said respective second portions.

9. The machine according to claim 6, wherein said motor is carried by said mobile member and the transmission system comprises a fixed belt, with which a pinion driven by the motor co-operates; said at least one resilient member being set between at least one end of the belt and a supporting structure thereof.

10. The machine according to claim 6, wherein said at least one resilient member comprises at least two helical springs arranged in parallel with respect to one another.

11. A measuring machine comprising:
    at least one member mobile along an axis;
    a motor;
    a transmission system co-operating with the motor for displacing the mobile member along said axis; and
    a control system for controlling said motor,
    said transmission system including at least one flexible coupling configured so as to filter the vibrations transmitted to the mobile member in the direction of said axis and to minimize the forces acting on said mobile member in a direction transverse to said axis, and
    said control system including a feedback control and an open-loop control comprising a jerk-control component.

12. The machine according to claim 11, wherein the open-loop control comprises a speed-control component.

13. A measuring machine comprising:
    at least one member mobile along an axis;
    a motor;
    a transmission system co-operating with the motor for displacing the mobile member along said axis; and
    a control system for controlling said motor,
    said transmission system including at least one flexible coupling configured so as to filter the vibrations transmitted to the mobile member in the direction of said axis and to minimize the forces acting on said mobile member in a direction transverse to said axis,
    the at least one flexible coupling comprising at least one resilient member deformable in a direction parallel to said axis, and
    said at least one resilient member comprising at least two helical springs arranged in parallel with respect to one another and deformable in a direction parallel to said axis, said helical springs working one in tension and the other in compression.

* * * * *